United States Patent Office 3,210,288
Patented Oct. 5, 1965

3,210,288
TRITIATED LUMINOUS COMPOSITIONS
Charles Charlton Evans, Stubbs Wood, Chesham Bois, and John Charles Maynard, Little Chalfont, England, assignors to the United Kingdom Atomic Energy Authority, London, England
No Drawing. Filed Mar. 7, 1963, Ser. No. 263,401
Claims priority, application Great Britain, Mar. 12, 1962, 9,503/62
19 Claims. (Cl. 252—301.1)

The present invention relates to luminous compositions, and is particularly concerned with luminous compositions comprising phosphor particles in intimate association with a tritiated polymeric substance.

Various prior proposals of luminous compositions including a phosphor activated by tritium are known, see for example U.S. Patent 2,749,251 Shapiro, British Patent 874,791, Gamma Gesellschaft and ors, British Patent 869,698, Westo G.m.b.H. and ors and French Patent 1,133,803 Lange, but such compositions all suffer from certain disadvantages. For example we consider that it is essential to provide a composition in which the tritium is chemically bound in a carrier, for otherwise an escape of gaseous tritium is possible and this is dangerous. On the other hand, if the tritium is chemically bound in the carrier this must be substantially insoluble in and substantially unaffected by all common hydrogen-containing liquids, e.g. water and organic solvents. The reason for requiring insolubility in these liquids is apparent.

According to the present invention there is provided a luminous composition comprising an intimate mixture of phosphor particles and a tritiated silicone polymer.

Also according to the invention, there is provided a method of producing a luminous composition comprising forming an intimate mixture of phosphor particles and a solution of a low molecular weight tritiated silicone polymer, removing the solvent from the mixture and heating the composition to cure the silicone polymer.

Also, according to a further aspect of the invention there is provided a method of producing a luminous composition which comprises exposing phosphor particles to the vapour of a tritiated organic-substituted halogenosilane, containing more than one halogen atom per silicon atom per silicon atom, in the presence of water vapour whereby an intimate mixture of the phosphor particles and a low molecular weight tritiated silicone polymer is formed by hydrolysis of the halogenosilane, and heating the composition to cure the silicone polymer.

When carrying the latter method into effect, hydrolysis of the silane may be carried out simultaneously with the exposure of the phosphor particles to the vapour of the halogenosilane, e.g. chlorosilane, for example by exposing the phosphor particles to water vapour and silane, or subsequently to such exposure, for example by adding water vapour to a mixture of the phosphor particles and the silane. Preferably, the phosphor particles are agitated in the vapour of the chlorosilane to promote the formation of a uniform coating of the polymer around the particles. The heating is effected subsequently to the removal of the hydrolysis products.

Either of the methods according to the invention may be repeated, or used consecutively to the other, in order to build up a thicker layer of tritiated silicone polymer around the phosphor particles.

A suitable phosphor is zinc sulphide containing one of the usual activators, e.g. cadmium or silver, but other known phosphors may be used.

Low molecular weight tritiated silicone polymers may be produced by a number of methods, e.g.:

(1)
Exposing a low molecular weight silicone polymer to tritium gas to effect exchange tritium with hydrogen in the organic groups in the polymer (the Wilzbach method).

(2)
(a) Introducing tritium into specific positions in a low molecular weight silicone polymer by reaction of a polymer containing a halogen atom in a suitable position therein with tritium gas in the presence of a hydrogenation catalyst (reductive dehalogenation); or
(b) Using tritium gas to effect the reductive dehalogenation of an organic halogenosilane, e.g. chlorosilane, containing a halogen atom in an organic group therein, and then hydrolysing the tritiated halogenosilane, either alone or with other halogenosilanes.

(3)
Addition of tritium across an ethylenic double bond.
(a) in a low molecular weight silicone polymer; or
(b) in an unsaturated alkoxysilane or halogenosilane, and hydrolysing the tritiated alkoxysilane or halogenosilane.

Examples of reaction according to methods (2) and (3) above are as follows:

(2)
(b) 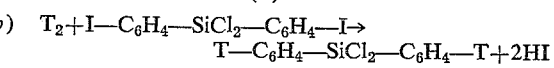

(3)
(a) 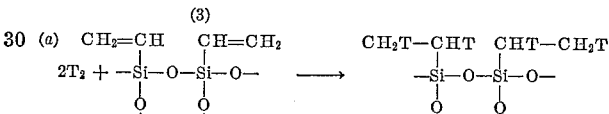

(b) 

or

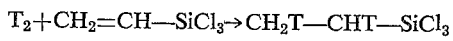

The tritiated halogenosilane is hydrolysed to a low molecular weight polymer by the addition of water to a solution of the silane in an organic solvent and it is possible at this stage to modify the properties of the final silicone by the addition of other halogenosilanes prior to hydrolysis. The low molecular weight polymer is recovered by freeze drying, i.e. solvent, water and halogen acid are removed, and taken up in an organic solvent for application to the phosphor if a solvent method of coating is to be employed.

The hydrolysis of a mono-alkyl or aryl halogenosilane produces a siloxane which on the elimination of water polymerises, with cross-linking, to produce a three dimensional molecule. Hydrolysis of a di-alkyl or di-aryl silane, however, results in straight chain polymers. Hence the chemical composition and properties of the final polymer will depend on the particular silane which is tritiated, but can be modified by addition of other silanes to the reaction mixture before hydrolysis.

For example, (a) the incorporation of phenyl trichlorosilane yields a cross-linked polymer, soluble in organic solvents when uncured, with enhanced radiation stability, and (b) the incorporation of diphenyl dichlorosilane yields a straight chain polymer, very soluble in organic solvents.

*Example I*

Adams' catalyst, a platinum hydrogenation (tritiation) catalyst, is prepared in the active form by reducing 130 mg. platinum oxide with hydrogen in alcoholic solvent (5 ml.), the reduction taking from 10 to 30 minutes at room temperature. The alcohol is then removed from the active catalyst by pumping and this pumping is continued for 30 minutes to dry the catalyst which is contained in a reaction flask capable of pressurising.

5 ml. of dioxane solvent and 4 mM. (0.65 grammes) of vinyl trichlorosilane are distilled into the reaction flask and 200 curies of tritium gas admitted to the flask which is maintained under an absolute pressure in the region of 30 to 40 cms. mercury. The reaction mixture is vigorously stirred during the addition of the tritium across the ethylenic double bond in accordance with reaction 3(b) above, the reaction taking 60 to 90 minutes.

The excess tritium gas is removed by pumping and the tritiated silane is distilled off the catalyst into a reservoir where 10 mM. (2.1 grammes) of phenyl trichlorosilane is added. The silane mixture is now completely hydrolysed by an excess of water (approximately 2-3 ml.). The excess water, dioxane and liberated hydrochloric acid are removed by freeze drying and the solixane residue dissolved in chloroform (approximately 10 ml.). Activated zinc sulphide phosphor (800 to 900 grammes) may be coated with the solixane mixture by slowly adding the solution in chloroform and allowing the solvent to evaporate. After drying, the powder is heated in vacuo at 150 to 200° C. for at least four hours to cure the polymer to a silicone resin.

*Example II*

Tritiated ethyl trichlorosilane is prepared as in Example I and 10 mM. of phenyl trichlorosilane added. The mixture of silanes and dioxane is then distilled into a receiver containing the phosphor which is agitated continuously as the silanes are added. On the completion of this distillation operation, 2-3 ml. of water are distilled into the receiver to hydrolyse the silanes to siloxanes. The powder is then heated slowly in vacuo to 150° to 200° C., the excess water, dioxane and liberated hydrochloric acid being removed, and the silicone polymer cured by maintaining it at this temperature for at least 4 hours.

We claim:

1. A luminous composition comprising an intimate mixture of phosphor particles and a heat-cured tritiated silicone polymer.

2. The composition of claim 1, wherein the silicone polymer comprises a cross-linked polymer.

3. The composition of claim 2, wherein the silicone polymer comprises a cross-linked aryl-alkyl silicone.

4. The composition of claim 1, wherein the silicone polymer is derived from an organic-substituted silane having at least two tritium atoms per molecule.

5. The composition of claim 1, wherein the phosphor is zinc sulphide.

6. A method of producing a luminous composition comprising the steps of forming an intimate mixture of phosphor particles with a solution of a low molecular weight tritiated silicone polymer, removing the solvent from the mixture and heating the composition to cure the silicone polymer.

7. The method of claim 6, including the step of preparing the tritiated silicone polymer by the reductive dehalogenation of a halogenated silicone polymer with tritium gas.

8. The method of claim 6, including the step of preparing the tritiated silicone polymer by the addition of tritium across an ethylenic double bond in a low molecular weight silicone polymer.

9. The method of claim 6, including the step of preparing the tritiated silicone polymer by a Wilzbach exchange between a silicone polymer and tritium gas.

10. The method of claim 6, including the step of preparing the tritiated silicone polymer by the hydrolysis of a tritiated halogenosilane.

11. The method of claim 6, including the step of mixing the low molecular weight tritiated silicone polymer with another silicone prior to heating.

12. A method of producing a luminous composition comprising exposing phosphor particles to the vapour of a tritiated organic-substituted halogenosilane, containing more than one halogen atom per silicon atom, in the presence of water vapour whereby an intimate mixture of the phosphor particles and a low molecular weight tritiated silicone polymer is formed by hydrolysis of the halogenosilane, and heating the composition to cure the silicone resin.

13. The method of claim 12, including the step of preparing the tritiated halogenosilane by the reductive dehalogenation of a halogenosilane by tritium gas.

14. The method of claim 12, including the step of preparing the tritiated halogenosilane by the addition of tritium across an ethylenic double bond in an unsaturated silane selected from the group consisting of alkoxysilanes and halogenosilanes.

15. The method of claim 12, including the step of mixing the low molecular weight tritiated silicone polymer with another silicone prior to heating.

16. The method of claim 15, including the step of mixing two silanes and hydrolysing them to produce said mixture of silicones.

17. A method of producing a luminous composition comprising forming an intimate mixture of phosphor particles with a solution of a tritiated organic-substituted halogenosilane having at least two halogen atoms per silicon atom; effecting hydrolysis of such silane to form a low molecular weight silicone polymer; removing the solvent, excess water and halogen acid; and heating the composition to cure the silicone resin.

18. The method of claim 17 including the step of mixing the low molecular weight tritiated silicone polymer with another silicone prior to heating.

19. The method of claim 17 including the step of mixing two silanes and hydrolysing them to produce a mixture of silicones.

No references cited.

CARL L. QUARFORTH, *Primary Examiner.*